United States Patent Office 3,471,440
Patented Oct. 7, 1969

3,471,440
CURABLE COMPOSITIONS OF DIOLEFIN POLYMERS
Bruce A. Ashby, Schenectady, N.Y., assignor to General Electric Company, a corporation of New York
No Drawing. Filed Aug. 26, 1965, Ser. No. 482,885
Int. Cl. C08d *5/02;* C08g *27/00*
U.S. Cl. 260—41.5    12 Claims

---

ABSTRACT OF THE DISCLOSURE

A curable composition convertible to the solid elastic state upon exposure to moisture is provided comprising an organic polymer, such as a diolefin polymer, or a copolymer of such diolefin and a vinyl compound, such as styrene, or acrylonitrile, where the organic polymer has chemically combined organosilyl radicals of the formula, $$V_a$$
$$G_{3-a}Si\text{—}$$

V is a monovalent radical selected from halogen radicals, alkoxy radicals, hydrocarbon radicals, and halogenated hydrocarbon radicals, G is a monovalent hydrolyzable radical selected from alkoxy radicals, acyloxy radicals, ketoximato radicals, and aminoxy radicals, and $a$ is a whole number equal to 0 to 2, inclusive.

---

The present invention relates to room temperature curable compositions comprising olefinically unsaturated organic polymer having organosilyl groups with hydrolyzable radicals attached to silicon.

Prior to the present invention, various one-package room temperature vulcanizing organopolyisiloxane compositions, such as shown by Bruner Patent 3,077,465, were utilized in a variety of applications. Cured products resulting from these compositions provide for the production of materials possessing many of the desirable characteristics of conventional organopolysiloxane elastomers. Recent developments also include room temperature vulcanizing materials in the form of isocyanate-terminated glycols and polyesters. Although these room temperature vulcanizing materials possess many advantages over conventionally cured organic rubbers, in certain applications, for example sealants for aircraft where weight is critical, the aforementioned room temperature vulcanizing materials are often rejected in favor of materials of reduced density.

The present invention is based on the discovery that certain organic polymers such as homopolymers of butadiene, copolymers of butadiene-styrene and butadiene-acrylonitrile, and certain hydroxy-containing derivatives thereof, can provide for the production of room temperature vulcanizing organic compositions curable to valuable elastomeric products of reduced density. These room temperature vulcanizing organic compositions can be as much as 25 percent lighter than the aforementioned room temperature vulcanizing organopolysiloxane, polyglycol, or polyester compositions. In addition, the room temperature vulcanizing organic compositions of the invention have a relatively short tack-free time.

Included by the present invention are compositions comprising room temperature curable organic polymer selected from homopolymers of a diolefin of the formula, (1)
$$CH_2=CH\text{—}\underset{\underset{T}{|}}{C}=CH_2$$

where T is a member selected from hydrogen, methyl and chloro, and copolymers of said diolefin of Formula 1 and a member selected from styrene and acrylonitrile, where said room temperature curable organic polymer has chemically combined organosilyl groups consisting of (A) at least one exterior monovalent silyl radical joined by carbon-silicon linkages to (B) an intermediate polyvalent organo radical directly attached to the organic polymer by a linkage selected from a carbon-silicon, an ether, an ester, a urethane and a carbonate, where the exterior monovalent silyl radical (A) has the formula, (2)
$$V_a$$
$$G_{3-a}Si\text{—}$$

V is a monovalent radical selected from halogen, alkoxy and R radicals selected from monovalent hydrocarbon radicals and halogenated monovalent hydrocarbon radicals, G is a monovalent radical selected from acyloxy, ketoximato, OY and a diorganosiloxane having an OY radical attached to silicon by a silicon-oxygen linkage and consisting essentially of at least one chemically combined $R_2SiO$ unit, where Y is a monovalent amine radical selected from —$NR'_2$ and a heterocyclic amine, R' is selected from alkyl radicals, and where the intermediate polyvalent organo radical (B) is a member selected from QD, $Q'(R''')_b$, $$\underset{O}{\overset{\|}{Q'(K)_bNHC\text{—}O\text{—}}}$$

and

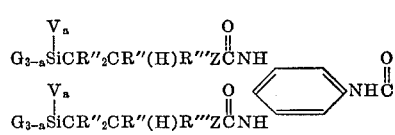

where Q is a member selected from Q' and divalent cycloalkane radicals having from 3 to 10 carbon atoms, D is a member selected from —O—, $$\underset{O}{\overset{\|}{-C-O-}},\ \underset{O}{\overset{\|}{O-C-}}\underset{O}{\overset{\|}{R'''C-O-}}$$

and $$\underset{O}{\overset{\|}{-O-C-O-}}$$

Q' is $CR''_2CR''(H)$, R'' is a member selected from hydrogen and alkyl radicals, R''' is selected from divalent hydrocarbon radicals and halogenated divalent hydrocarbon radicals, K is selected from R''' and a divalent ether radical having the characteristic group R'''OR''', Z is a member selected from —O—, —S—, and —NR''—, W is selected from polyvalent hydrocarbon radicals having a valence of at least 2, $a$ is a whole number equal to 0 to 2, $b$ is a whole number equal to 0 or 1, and $c$ is an integer equal to 1 or 2, and one less than the valence of W. For example, an organosilyl group of the formula, $$V_a$$
$$(YOR_2SiO)_{3-a}SiQ\text{—}$$

can be joined to the oragnic polymer by an ether linkage. An illustration of an organosilyl group $$V_a$$
$$G_{3-a}Si\text{—}$$

joined to the organic polymer by a urethane linkage $$\underset{O}{\overset{\|}{Q(K)_bZC\text{—}NH}}\Big|_c\underset{O}{\overset{\|}{WNHC\text{—}O\text{—}}}$$

is

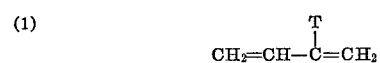

where Q is $CR''_2CR''(H)$ and W is

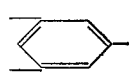

Radicals included by R are, for example, aryl radicals, and halogenated aryl radicals, such as phenyl, chlorophenyl, naphthyl, etc.; aralkyl radicals such as benzyl, phenylethyl, etc.; aliphatic, haloaliphatic, and cycloaliphatic such as alkyl, for example, methyl, ethyl, propyl, butyl, hexyl, heptyl, octyl; haloalkyl, such as trifluoropropyl, fluorobutyl, cycloalkyl, such as cyclobutyl, cyclohexyl. Alkyl radicals included by R' and R'' are the same alkyl radicals included by R. Radicals included by R''' are alkylene, for example, methylene, ethylene, trimethylene; haloalkylene such as chloroisopropylene, fluorobutylene, etc.; arylene such as phenylene, naphthalene, etc.; haloalkylene such as chlorophenylene, etc. Radicals included by K are for example, R''' radicals and alkyleneoxyarylene radicals such as ethyleneoxyphenylene, etc.; alkyleneoxyalkylene such as ethyleneoxypropylene, etc.; aryleneoxyarylene such as phenyleneoxyphenylene, etc. Radicals included by W are R''' radicals and polyvalent radicals such as

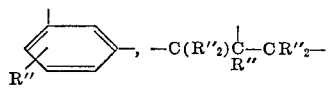

etc. Divalent cycloalkane radicals to which the silyl radicals of Formula 2 can be attached include for example, divalent cyclobutane, divalent cyclopentane, divalent cyclohexane, etc. Radicals included by V are for example, alkoxy such as methoxy, ethoxy, propoxy, tert-butoxy, etc.; halogen radicals such as chloro, bromo, iodo, etc. In the above formulae, where R, R', R'', R''' and W can represent more than one radical respectively, these radicals can be all the same or any two or more of the aforementioned radicals.

The room temperature curable organic polymer of the present invention having chemically combined silyl radicals of Formula 2, hereinafter referred to as the "curable organic polymer", where G of Formula 2 is acyloxy and ketoximato, can be made by effecting reaction between organic polymer containing olefinic unsaturation referred to hereinafter as the "olefinically unsaturated organic polymer" and a silicon hydride of the formula, (3)    $X_{3-a}\overset{R_a}{\underset{|}{Si}}H$ where R and $a$ are as defined above and X is a radical selected from acyloxy and ketoximato. The olefinically unsaturated organic polymer can include homopolymers of diolefin of Formula 1, copolymers of said diolefin and a member selected from styrene and acrylonitrile as previously shown, and olefinically unsaturated organic polymer having Q'' radicals joined to the olefinically unsaturated organic polymer by a linkage selected from an ether, a urethane, and a carbonate where Q'' is selected from alkenyl and cycloalkenyl radicals of 3 to 10 carbon atoms. Curable organic polymer having silyl radicals of Formula 2, where G is a monovalent radical selected from OY and a diorganosiloxane having an OY radical attached to silicon by a silicon-oxygen linkage, and consisting essentially of at least one chemically combined $R_2SiO$ unit, can be made by effecting reaction between a silicon hydride of the formula, (4)    $X'_{3-a}\overset{R_a}{\underset{|}{Si}}H$ where X' is a member selected from hydrogen, halogen, alkoxy, and a diorganosiloxane consisting essentially of at least one $R_2SiO$ unit and a hydrogen atom attached to silicon by a silicon-hydrogen linkage to the olefinically unsaturated organic polymer; the resulting organic polymer having silyl radicals with monovalent X' radicals attached to silicon can be further reacted with a hydroxylamine of the formula, (5)    HOY Some of the methods which can be employed for making the curable organic polymer of the present invention by effecting reaction between hydroxylamine of Formula 5 and organic polymer having silyl radicals resulting from the addition thereto of silicon hydride of Formula 4 are illustrated on copending application Ser. No. 423,354, filed Jan. 4, 1965, for R. A. Murphy, assigned to the same assignee as the present invention, which is incorporated herein by reference. For example, such organic polymer having silyl radicals with hydrogen attached to silicon can be converted to organic polymer having silyl radicals of Formula 2 with aminoxy radicals attached to silicon by silicon-oxygen linkages by contact with hydroxyl amine of Formula 5. Reaction between hydroxylamine and X' radicals included by Formula 4 such as halogen or alkoxy also are shown in the aforementioned copending application.

Olefinically unsaturated organic polymer selected from homopolymers of diolefin of Formula 1, copolymers of said diolefin and a member selected from styrene, etc., as previously defined, can be produced by well known methods such as by polymerizing mixtures of olefinically unsaturated hydrocarbon monomers, for example, butadiene, isoprene, chloroprene, styrene, and organic materials such as acrylonitrile, etc., where the mixtures polymerized contain at least 50 mole percent of butadiene or butadiene derivatives such as isoprene or chloroprene. These olefinically unsaturated organic polymers can have viscosities in the range of about 10,000 centipoises to 600,000 centipoises at 25° C., and a molecular weight in the range of between 1000 to 5000. Standard procedures of homopolymerization and copolymerization can be utilized as shown in Preparative Methods of Polymer Chemistry by W. R. Sorensen and T. W. Campbell, pages 216 to 224, Interscience Publishers, Inc., New York (1961). Preferably, the olefinically unsaturated organic polymer is a copolymer of butadiene and styrene.

In addition to the above-described olefinically unsaturated organic polymer, the present invention also includes commercially available olefinically unsaturated organic polymer having hydroxy radicals attached to carbon, in addition to containing olefinic unsaturation. Depending upon the average molecular weight of the olefinically unsaturated organic polymer, the proportion of hydroxy radicals per polymer of molecule will vary. Experience has shown that olefinically unsaturated organic polymers having an average of about two or three hydroxy radicals per polymer molecule, provide for optimum results.

Also included by the olefinically unsaturated organic polymer of the present invention are polymers having Q'' radicals attached by a linkage selected from a carbonate, a urethane, etc., as shown above. These olefinically unsaturated organic polymers can be obtained by effecting reaction between the above-described hydroxy-containing olefinically unsaturated polymer and materials such as olefinically unsaturated isocyanates, or polyisocyanates, phosgene, etc., in combination with olefinically unsaturated compounds of the formula, (6)    Q''ZH Included by the olefinically unsaturated compounds of Formula 6 are for example, allyl alcohol, allyl mercaptan, allyl amine, etc.; cyclohexanol, etc., p-allyl phenol, p-aminostyrene, etc. Methods for introducing urethane linkages into the olefinically unsaturated organic polymer having Q'' radicals attached by silicon-carbon linkages are shown in my copending application Ser. No. 463,877, filed June 14, 1965, and assigned to the same assignee as the present invention. Organic polymer having olefinically unsaturated ester linkages can be made by effecting contact between the olefinically unsaturated organic polymer having hydroxy radicals and a monocarboxylic acid having olefinically unsaturated linkages. For example, propenoic acid, methylpropenoic acid, 2,4-hexadienoic acid, oleic acid, etc., can be employed. Similarly, unsaturated haloformic acids can be utilized directly with the hydroxylated organic polymer.

Methods for making curable organic polymer having organosilyl groups as the result of silicon-hydride addition of silane of Formula 3 or 4 to the olefinically unsaturated organic polymer are well known. For example, addition can be effected in the presence of a platinum catalyst in accordance with the procedure shown in my Patent 3,159,662, assigned to the same assignee as the present invention utilizing a platinum-olefin catalyst. In addition, material such as chloroplatinic acid, finely divided platinum, etc., can be employed. In such instances where the curable organic polymer is made by a silicon hydride addition of a silane of Formula 3 or 4 to the olefinically unsaturated organic polymer containing Q″ radicals as previously described, it is preferred that the olefinically unsaturated organic polymer is free of hydroxy radicals.

Hydroxyl amines included by Formula 2 are for example, heterocyclic hydroxyl amines such as N-hydroxylpyrrolidine, N-hydroxylethyleneimine, N-hydroxypiperidine, N-hydroxymorpholine, etc. Diorgano substituted hydroxylamines such as N,N-dimethyl-, diethyl-, diisopropyl-, dipropyl-, dibutyl-, dipentyl-, dihexyl-, dicyclohexyl-, methylethyl-, methylpropyl-, methylbutyl-, diphenyl-, ditolyl-, methylphenyl-, methylnaphthyl-, etc.

Included by the silicon hydrides of Formula 4 are halosilanes such as trichlorosilane, methyldichlorosilane, dimethylchlorosilane, phenyldichlorosilane, etc.; alkoxysilane such as triethoxysilane, methyldiethoxysilane, phenyldimethoxysilane, etc.; acyloxysilane such as

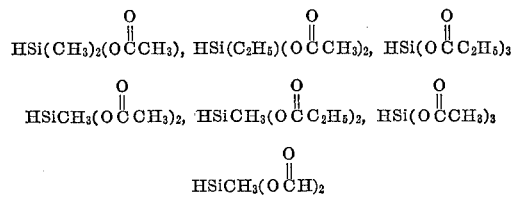

etc.; ketoximatosilanes such as, $$HSiCH_3[ONC(CH_3)(C_2H_5)]_2$$
$$HSi(CH_3)_2[ONC(CH_3)(C_2H_5)]$$
$$HSi[ONC(CH_3)(C_2H_5)]_3$$
$$HSiCH_3[ONC(CH_3)_2]_2, \text{ etc.}$$

There also are included silanes of the formula,

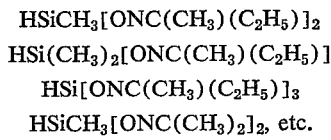

for example, silicon hydrides such as

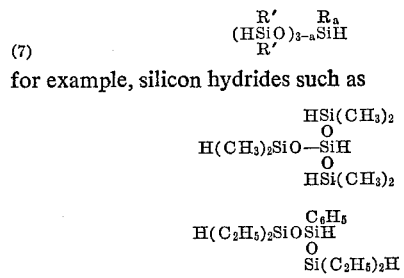

etc. In addition, the silicon hydrides of Formula 4 also can include polydiorganosiloxane consisting essentially of up to about 1,000 chemically combined $SiR_2O$ units, and either a minor amount of HSiRO units, or terminal $HSiR_2O$ units. Methods of making silicon hydrides of Formula 7 are shown by A. L. Smith, Spectrochim Acta (1959), 412–20.

In accordance with the practice of the invention, the curable organic polymer can be made by various methods. In instances where reaction is effected between the hydroxylamine of Formula 5 and olefinically unsaturated organic polymer having terminal silyl radicals of Formula 4, with hydrogen attached to silicon, temperatures between 25° C. to 100° C. are preferred. Where X′ of Formula 4 is halogen or alkoxy, temperatures between 25° C. to 130° C. provide for optimum results. Phosgenation of a mixture of a compound of Formula 6 and olefinically unsaturated organic polymer containing hydroxy radicals can be effected at temperatures between −20° C. to 100° C.

Experience has shown that the room temperature vulcanizing compositions of the present invention comprising the curable organic polymer are stable for at least 6 months or more at a temperature in the range of between 0° C. to 100° C., if there are present in the composition no more than 100 parts of water per 1,000,000 parts of composition. Well known procedures can be employed to minimize the presence of water in the final composition. For example, mixing of the ingredients of the composition can be performed under inert gas atmosphere such as nitrogen, etc.

The curable compositions of the present invention can contain curing accelerators, such as stannous octoate, dibutyltin dilaurate, stannous oleate, which can be utilized in amounts of about 0.001 percent to 10.0 percent, by weight of compositions. Fillers also can be utilized in proportions up to about 10 to 300 parts of filler per 100 parts of curable organic polymer. For example, filler such as carbon black, diatomaceous earth, fumed silica, etc., can be employed. Reinforcing materials, such as silicon carbide whiskers, glass fibers, etc., can be utilized. In addition, pigments, heat stabilizers, plasticizers, also can be employed.

The curable compositions of the present invention can be utilized in sealing and caulking applications, in roof construction, as an encapsulating and potting compound, etc.

In order that those skilled in the art will be better able to practice the present invention, the following examples are given by way of illustration and not by way of limitation. All parts are by weight.

EXAMPLE 1

There were added 5 parts of diacetoxymethylsilane to 110 parts of a copolymer of about 80 mole percent of butadiene and 20 mole percent of styrene having a viscosity of about 400,000 centipoises at 25° C. in the presence of .004 part of platinum metal in the form of a platinum-ethylene complex. The mixture was heated to 110° resulting in the initiation of an exothermic reaction. An additional 5 parts of diacetoxymethylsilane was added to the mixture which was maintained at a temperature between 110° C. to 120° C. for about 1 hour. Forty parts of the resulting product were poured onto a tin plate and allowed to cure under atmospheric conditions for about 4 days. The surface of the mixture was tack-free in less than 2 hours, after exposure to atmospheric conditions. A slab cut from the cured sheet showed hardness (Shore A) 45, tensile (p.s.i.) 40, and elongation (percent) 38.

EXAMPLE 2

There were added 16 parts of diacetoxymethylsilane to 184 parts of polybutadiene having a viscosity of about 50,000 centipoises at 25° C. The addition was performed at a temperature of 100° C. in the presence of .004 part of platinum metal as utilized in Example 1. The mixture was stirred and heated at 100° C. for about 7 hours before the mixture showed no silicon hydride absorption based on its infrared spectrum. The resulting product was a polybutadiene polymer having chemically combined methyldiacetoxysilyl radicals, based on its method of preparation.

A mixture of 150 parts of the above curable organic polymer and 60 parts of carbon black were mixed for 1 hour in the absence of atmospheric moisture. There were then dispersed in the mixture 0.05 part of stannous octoate by agitating the resulting mixture for 15 minutes. The resulting mixture was degassed for 1 hour and placed in a sealed container and stored in a nitrogen filled bag. A sheet was formed from this material which was covered with a piece of wet paper and allowed to cure at room temperature for 5 days. The cured product showed a tensile (p.s.i.) of 140, an elongation (percent) of 71, a hardness (Shore A) of 38, and a density at 25° C. of 1.0492.

EXAMPLE 3

A mixture of 114 parts of polybutadiene containing an average of about 2 hydroxy radicals per polymer molecule and 200 parts of toluene is made under moisture free conditions. There are added to the resulting mixture, 7.91 parts of pyridine and 12.1 parts of allyl chloroformate; the mixture is allowed to stand overnight at room temperature. The mixture is washed with water, dilute aqueous hydrochloric acid, and again with water. The organic phase is separated; residual water is refluxed from the resulting mixture in the form of a toluene azeotrope. There are added 10.8 parts of dimethoxymethylsilane in the presence of 0.002 part of a platinum-ethylene complex at 100° C. When the mixture is free of silicon hydride as shown by its infrared spectrum, 17.8 parts of diethylhydroxylamine are added. The mixture is then heated to effect removal of methanol. After gas chromatographic analysis indicates the methanol has been completely removed, the remaining toluene is stripped under vacuum. There is obtained a polybutadiene having allyl carbonate linkages with methyldiethylaminoxy radicals attached thereto. On pouring the polymer onto a tin plate and exposing it to the atmosphere, an elastomeric solid is obtained having valuable sealant and insulating properties.

EXAMPLE 4

There were added 13.6 parts of allyl isocyanate to a mixture of 200 parts of a homopolymer of butadiene having chemically combined hydroxy radicals and a hydroxyl number of 0.82 (meq. OH/g.) in the presence of 0.15 part of dibutyltin dilaurate. The mixture was heated to 100° C. for a period of two hours. There were then added to the mixture 0.004 part of platinum metal in the form of a platinum-ethylene complex followed by 26.6 parts of diacetoxymethylsilane while the temperature of the mixture was maintained at 100° C. When the infrared spectrum of the mixture indicated that it was free of silicon hydride absorption, 0.01 part of stannous octoate was added. The mixture was poured out onto a tin plate under atmospheric conditions. The surface of the resulting film which formed was tack-free in less than two hours. The product was examined after several days. It showed a tensile (p.s.i.) of 98, an elongation (percent) of 21, a tear (p.i.) of 8.7, a hardness (Shore A) of 59, and a density at 25° C. of 0.939.

EXAMPLE 5

There were added to a mixture of 200 parts of a copolymer of butadiene-acrylonitrile having a hydroxy number of 0.65 (meq. OH/g.) and 95 parts of toluene at a temperature of 100° C., 0.1 part of dibutyltin dilaurate and 10.8 parts of allyl isocyanate. The addition was performed under dry nitrogen. The copolymer of butadiene-acrylonitrile consisted of about 85% by weight of butadiene and 15% by weight of acrylonitrile. When the infrared spectrum of the resulting product was free of isocyanate absorption, 21 parts of diacetoxy methylsilane and 0.003 part of platinum in the form of a platinum-ethylene complex were added at a temperature of 100° C. The mixture was then stripped of toluene under reduced pressure when its infrared spectrum indicated that it was free of silicon-hydride absorption. The product was then poured onto a tin plate and allowed to cure under atmospheric conditions. A tack-free product was obtained in less than two hours. The cured product showed valuable elastomeric and sealant properties. It had a density at 25° C. of 0.966.

Those skilled in the art know that the above examples show that the curable compositions of the present invention provide for valuable elastomers, sealants and insulators of reduced density. The curable compositions of the present invention can be utilized effectively in all applications in which conventional room temperature compositions are employed.

While the foregoing examples have of necessity been limited to only a few of the very many variables within the scope of the present invention, it should be understood that the present invention is directed to a much broader class of curable compositions comprising organic polymers having exterior silyl radicals of Formula 2. These curable compositions can be made by effecting reaction between olefinically unsaturated organic polymer and silicon hydride of Formula 3 or 4 in the presence of a platinum catalyst. It also is understood that the present invention is directed to a method for making the curable compositions of the present invention involving the use of a variety of conditions and reactions as shown in the foregoing discussion and further illustrated in the examples above.

What I claim as new and desire to secure by Letters Patent of the United States is:

1. A curable composition substantially free of moisture and convertible to the solid elastic state at room temperature upon exposure to atmospheric moisture, comprising organic polymer having a viscosity in the range of from about 10,000 centipoises to 600,000 centipoises at 25° C. and a molucular weight in the range of between 1000 to 5000, selected from the class consisting of (A) homopolymers of a diolefin of the formula

where T is hydrogen or methyl, and (B) a copolymer of said diolefin and a member selected from the class consisting of styrene, acrylonitrile, and mixtures thereof, where said organic polymer has chemically combined organosilyl radicals of the formula,

V is a monovalent radical selected from the class consisting of halogen radicals, alkoxy radicals, hydrocarbon radicals and halogenated hydrocarbon radicals, G is a monovalent hydrolyzable radical selected from the class consisting of alkoxy radicals, acyloxy radicals, ketoximato radicals, and aminoxy radicals, and $a$ is a whole number equal to 0 to 2, inclusive.

2. A curable composition in accordance with claim 1, where the organic polymer is a homopolymer of butadiene.

3. A curable coposition in accordance with claim 1, where the organic polymer is a copolymer of butadiene and styrene.

4. A curable composition in accordance with claim 1, where the organic polymer is a copolymer of butadiene and acrylonitrile.

5. A curable composition in accordance with claim 1, containing a filler.

6. A curable composition in accordance with claim 1, where the silyl radicals attached to said organic polymer are selected from the class consisting of diethylaminoxysilyl radicals and a silyl radical chemically combined by a siloxane linkage to a dimethylsiloxane having a diethylaminoxy radical attached to silicon by a silicon oxygen linkage where said dimethylsiloxane consists essentially of at least one dimethylsiloxy unit.

7. A curable composition in accordance with claim 1, where the organosilyl radicals attached to said organic polymer are diethylaminoxysilyl radicals.

8. A curable composition in accordance with claim 1, where the organosilyl radicals attached to said organic polymer are acetoxysilyl radicals.

9. A curable composition in accordance with claim 1, where said organosilyl radicals are attached to said organic polymer by silicon-carbon linkages.

10. A curable composition in accordance with claim 1, where said organosilyl radicals are attached to said organic polymer through urethane linkages.

11. A curable composition in accordance with claim 1, where said organosilyl radicals are attached to said organic polymer by carbonate linkages.

12. A curable composition in accordance with claim 1, containing carbon black.

References Cited

UNITED STATES PATENTS

| | | | |
|---|---|---|---|
| 2,823,218 | 2/1958 | Speier et al. | 260—448.2 |
| 2,970,150 | 1/1961 | Bailey | 260—348 |
| 3,077,465 | 2/1963 | Bruner | 260—46.5 |
| 3,220,972 | 11/1965 | Lamoreaux | 260—46.5 |
| 3,336,612 | 1/1968 | Baldwin et al. | 260—85.3 |
| 3,170,891 | 2/1965 | Speier | 260—37 |

FOREIGN PATENTS 1,181,907  11/1964  Germany.

OTHER REFERENCES

Preparation of Silicon-Containing Diene Polymers by Addition of Organosilicon Hydrides, Chem. Abstracts, vol. 63, pages 11, 712, 1965, by Minoura et al.

JOSEPH L. SCHOFER, Primary Examiner

WILLIAM F. HAMROCK, Assistant Examiner

U.S. Cl. X.R.

260—2, 37, 46.5, 83.3, 85.1, 94.7